March 14, 1967  V. A. GILL  3,308,850
CABLE ACTUATED MULTI-FITTING GAS VALVES
Filed Oct. 1, 1964  4 Sheets-Sheet 1

INVENTOR.
VINCENT A. GILL
BY
*Harry G. Mapero*
ATTORNEY

March 14, 1967 V. A. GILL 3,308,850
CABLE ACTUATED MULTI-FITTING GAS VALVES
Filed Oct. 1, 1964 4 Sheets-Sheet 2

INVENTOR.
VINCENT A. GILL
BY
*Harry G. Shapiro*
ATTORNEY

March 14, 1967 V. A. GILL 3,308,850
CABLE ACTUATED MULTI-FITTING GAS VALVES
Filed Oct. 1, 1964 4 Sheets-Sheet 4

INVENTOR.
VINCENT A. GILL
BY
ATTORNEY

United States Patent Office 3,308,850
Patented Mar. 14, 1967

3,308,850
CABLE ACTUATED MULTI-FITTING
GAS VALVES
Vincent A. Gill, Montclair, N.J., assignor to General
Pneumatic Corporation, Newark, N.J., a corporation
of New Jersey
Filed Oct. 1, 1964, Ser. No. 400,793
22 Claims. (Cl. 137—625.32)

The invention relates to valves, and is more particularly directed to improvements in valves of the type actuated by a cable or lanyard.

Cable actuated valves are used in conjunction with gas containers such as bottles or cylinders of air or oxygen under pressure. Generally, a cable actuated valve has five fittings associated therewith; that is, a fitting for the gas container, a discharge fitting, a pressure gauge, a rupture disk or relief valve and a filler valve. Where the gas container and associated cable actuated valve and fittings are used in aircraft, such equipment must fit into the available space, which almost always is very limited.

Aircraft installations vary and present different space conditions for the gas container, different conditions for viewing of the pressure gauge, and different conditions of accessibility to the cable, to the filler valve and to the discharge fitting. Where the fittings and the valve's port for the cable are in a fixed relationship with respect to one another and with respect to the valve member actuated by the cable, it has been necessary to have available a variety of valves having different arrangements of related fittings. A valve device having fixedly related fittings suitable for one installation is not suitable in another installation because of interference with adjoining equipment. Frequently, this has required stocking valves and associated fittings of different manufacturers because a device supplied by one manufacturer which will fit within one installation will not fit in another installation.

To the user, the necessity to use valve devices of different structures and/or from different manufacturers has a number of disadvantages. Larger inventories are necessary. Also, one must be able to repair any valve for any installation at all times, thereby necessitating the stocking of spare parts for the different types of valves. In addition, the repair or reactivation of the valve assemblies is not as efficient, because the personnel whose duty it is to service the equipment must be versed in a variety of different valve structures. Still another disadvantage resides in the higher prices which one must pay for valves; small lots of different valve constructions must be purchased instead of a larger quantity of a single kind of unit.

It will be apparent that a single valve construction which can be used to fit within a variety of space condition, and differing conditions of visual and manual access to the parts of the unit, is highly desirable and would eliminate the foregoing disadvantages.

The primary object of the invention is to provide a valve which solves the aforementioned problems and eliminates the aforesaid disadvantages. The unitary valve of the invention is constructed to permit interchangeability or universality with regard to the essential fittings thereof, and to further provide means for changing the location of the cable port with respect to the fittings. As a result, and with a single valve unit, substantial flexibility is afforded for the location of the bulky gas container, together with visual and manual accessibility to those parts associated with the valve which require viewing and manual operation.

In realizing the foregoing main objective of the invention, the valve is constructed to provide exit flow of gas at an angle of 90 degrees with respect to the direction of flow entering the valve. In the valve of the invention, the discharge port may be located out of axial alignment with respect to the port within which the gas container fitting is located. Accordingly, another object of the invention is to provide the pulley member and valve shaft of the valve with cooperable means permitting selective direction of gas flow through the valve.

A further object of the invention is to provide a valve of the plug or ball valve member type wherein the shaft for rotating the valve member is cooperatively related to the valve member to form, in effect, a universal joint, whereby the valve shaft is free for movement to an extent which may accommodate the eccentricity of the ball valve member due to manufacturing tolerances, and to compensate for the fact that the ball valve member and the valve shaft cannot be perfectly aligned within normal manufacturing practices.

These, and other objects and advantages of the invention will be apparent from the following detailed description, taken in conjunction with the drawings illustrating a preferred embodiment of the invention, in which.

Figure 2:
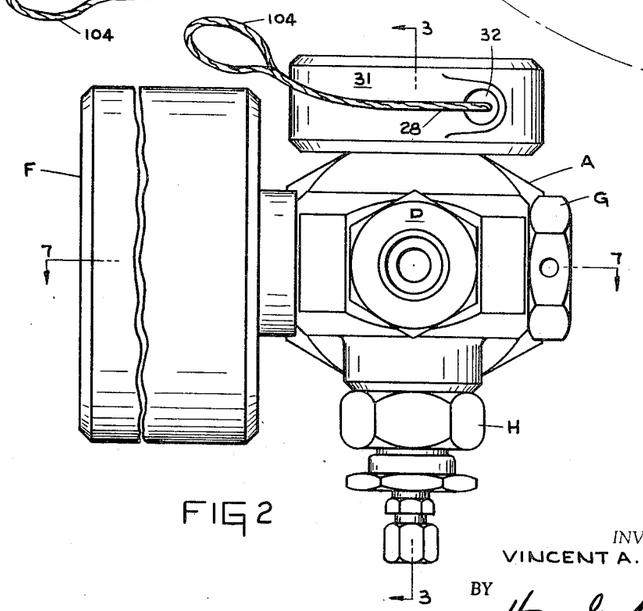
FIG. 2 is a side elevational view of the valve and assembled fittings when viewed in the direction of the arrows 2—2 of FIG. 1.
Figure 3:
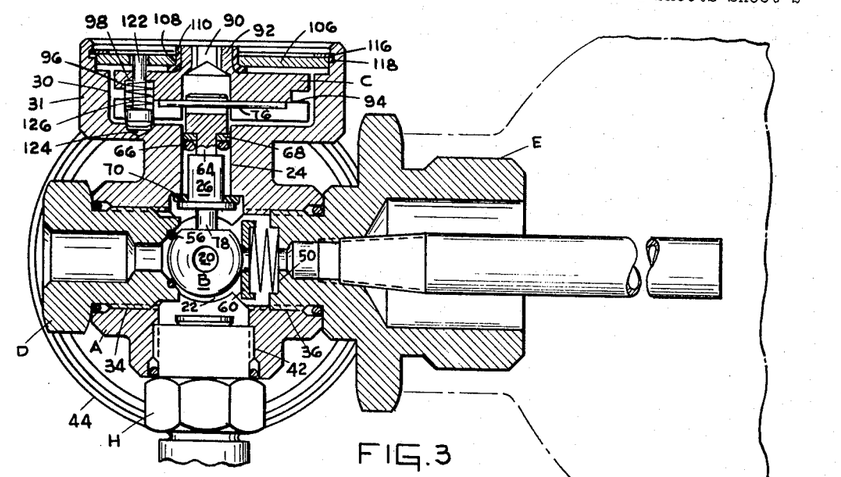
FIG. 3 is a vertical cross-sectional view taken approximately in the plane of line 3—3 of FIG. 2, this view showing the cable actuatable valve in closed position with respect to the dischage port.
Figure 4:
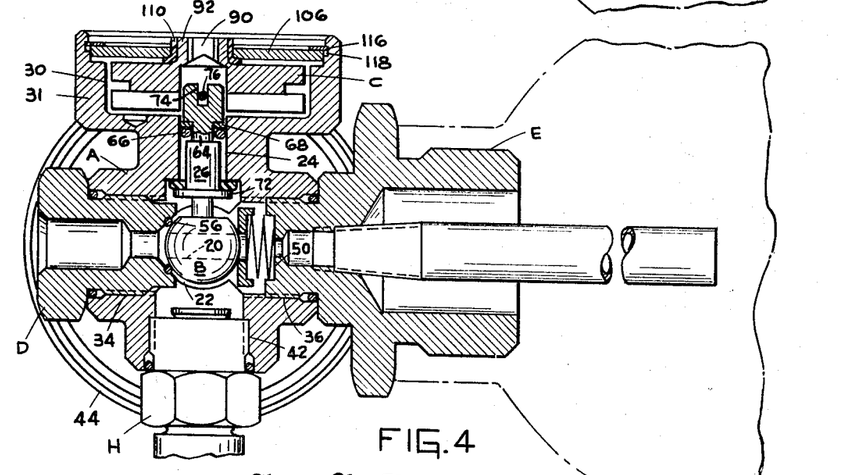
FIG. 4 is a view similar to FIG. 3, this view however, showing the cable actuatable valve in open position.

Referring to the drawings, a cable actuated valve made in accordance with the invention generally, comprises a hollow body A within which a plug valve member B, preferably in the form of a spherical ball, is mounted for rotation. The ball valve member is provided with the usual bore or through-hole 20. The valve body A is machined to provide five ports or openings each of which is in communication with an internal chamber 22 within which the ball valve is situated. As shown in FIGS. 3 and 4, the valve body is machined to provide a shaft opening 24 in a wall thereof through which extends a valve shaft 26, the lower end of which is connected to the ball member. The opposite or upper end of the valve shaft is connected to a pulley C for rotating the valve member from its closed to open position. The pulley is rotated by a cable 28 (FIGS. 1 and 2), thereby rotating the valve shaft 26 and the ball valve member. The valve body is machined to furnish an annular recess 30 which is open to the exterior. The pulley C is positioned within the recess 30. Also, the annular wall 31 which defines the recess for the pulley has an opening or cable port 32 formed therein (FIG. 2) through which the cable 28 is extended for connection to the pulley.

In greater detail, the five ports provided by the valve body A are located upon three mutually perpendicular axes. As shown in FIGS. 7, 10, 11 and 11A, the valve body A is formed to provide a pair of opposite, axially aligned ports 34 and 36 each of which is in communication with the central internal chamber 22 of the valve body. This pair of ports may be described as located on the X axis. Also, the valve body is formed to provide a second pair of opposite, axially aligned ports 38 and 40, also in communication with the chamber 22, which are disposed on a second or Y axis loacted 90 degrees with respect to the axis of the ports 34 and 36. Thus, the ports 34, 36, 38 and 40 lie in respective quadrants or are spaced 90 degrees apart. The four ports are made of the same diameter and are provided with identical internal threading.

Figure 3A:
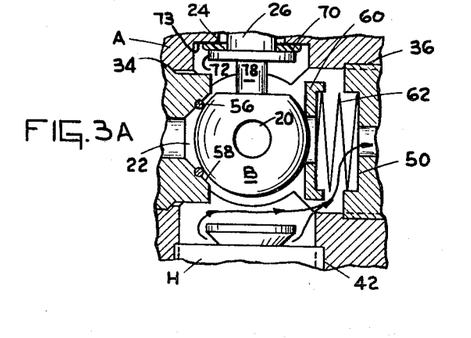
FIG. 3A is an enlarged view of the valve and its related parts when the filler valve fitting is in open position allowing the flow of gas through the container fitting for the filling of a gas container.

As indicated by FIGS. 2, 3, 3A and 4, a fifth port 42 is located on a third or Z axis which is disposed at 90 degrees with respect to the axes of the ports 34, 36, 38 and 40. Although not essential to realize a number of the advantages of the invention, it is preferred that the port 42 have the same diameter and internal threading as the other four ports. It is within the scope of the invention, however, to make the port 42 of a different diameter than the other four ports and with a different form of thread. As also shown in FIGS. 3, 3A and 4, the valve shaft 26 is disposed on the same axis in alignment with and opposite to the port 42. Thus, the ball valve member B is rotatable about the third or Z axis.

As shown in FIGS. 3, 3A, 4 and 7, the port 34 has threaded therein a discharge fitting D; the port 36, a gas container or bottle fitting E, the bottle being shown in phantom; the port 38, a pressure gauge fitting F; the port 40, a rupture disk or relief valve fitting G; and the port 42, a filler valve H. The ports 34, 36, 38 and 40 are each adapted to interchangeably receive the discharge fitting B, the bottle fitting E, the pressure gauge fitting F and the rupture disk fitting G. Such interchangeability may be accomplished by virtue of the acceptability of any one of these fittings in any one of the same size and threaded ports, and by virtue of the structure of the ball valve member permitting, as will be subsequently explained, the location of the discharge fitting and the bottle fitting in ports which are out of axial alignment, or at an angle of 90 degrees with respect to one another.

Where the port 42 is made of the same diameter and with the same internal threading as the ports 34, 36, 38 and 40, the bottle fitting E, the pressure gauge fitting F and the rupture disk fitting G, in addition to the filler valve H, also may each be interchangeably positioned within the port 42. Only the discharge fitting D cannot be positioned within the port 42 because the discharge fitting must be related to the valve member B for alignment with the valve member's central bore 20. The only other limitation upon interchangeability of the five fittings within the five ports is that the filler valve H cannot be axially aligned with the discharge fitting D. Otherwise, all the aforementioned five fittings may be interchangeably positioned in any one of the aforementioned five ports when, in accordance with the preferred form of the invention, the fifth port, the port 42, is made of the same diameter and with the same threading as the other four ports.

Figure 10:
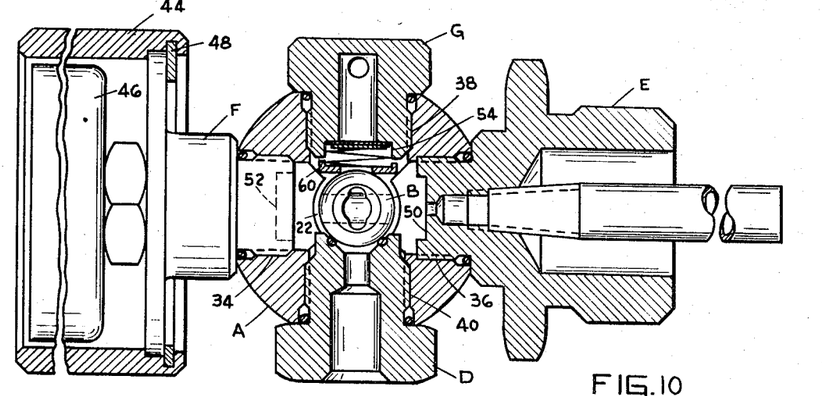
FIG. 10 is the same view as shown in FIG. 7, this view however showing a different relationship of the discharge fitting, rupture disk fitting, pressure gauge fitting, and container fitting as permitted by the valve of the invention, this view, like FIG. 7, showing the valve in closed position.

The structures of the aforementioned fittings are known in the art and do not constitute a part of the present invention. They each have associated therewith an O-ring which is received within a counterbore formed in the valve body A at each port to effectuate sealing. With regard to the pressure gauge fitting F, and as shown, a suitable guard 44 may be mounted to surround and protect the pressure gauge 46, the connection of the guard to the fitting being accomplished by a snap ring 48 as shown in FIG. 10. As is usual for these parts, the bottle fitting E, the pressure gauge fitting F and the rupture disk fitting G are each provided with an annular counterbore at their forward ends, or the ends which face the internal chamber 22 of the valve body when these fittings are threaded into the ports. These counterbores provide seats, respectively designated 50, 52 and 54, for a spring, as will be subsequently described. The seats are of the same diameter. All of the fittings, of course, are externally threaded to enable their being screwed into the ports. Where, for example, the valve is intended for operation at 3,000 p.s.i., the frangible disk in the rupture disk assembly may be selected to break at 4,500 p.s.i.

The ball valve member B has the central through-hole 20 for the passage of gas from the valve when the hole is aligned with a port having the discharge fitting threaded therein, and prevents flow out of the valve when the ball is rotated 90 degrees. To prevent leakage past the ball, a suitable non-porous, non-galling, wear-resistant seat ring 56 is provided for engagement with the periphery of the ball. The sealing and seat ring, which is preferably made of Teflon, is held in a groove formed in the wall of a countersink 58 of the discharge fitting, such countersink facing the valve body's internal chamber 22 when this fitting is threaded into any one of the ports 34, 36, 38 or 40. The seat ring 56 is located on the X or Y axis and in any one of the quadrants of the valve body A. To keep the ball valve member B on the seat provided by the sealing ring 56 during unpressurized operation, and to aid sealing at low pressure, a ball guide and supporting member 60 is urged by resilient means or a spring 62 against the ball valve member at the side thereof opposite the side at which the seat ring is located. As shown in FIGS. 3, 3A, 4, 7, 10, 11 and 11A, the guide member 60 is of annular contour and has a central opening so that the annular, forward edge thereof, at the periphery of the opening, may bear against the ball valve member. The rear of the guide ring 60 is provided with an annular recess to furnish a seat for one end of the spring 62. The opposite end of the spring is seatable in any one of the seats 50, 52 and 54 provided by the bottle fitting, pressure gauge fitting or the rupture disk fitting. Thus, when either the bottle fitting, the pressure gauge fitting or the rupture disk fitting is positioned opposite the discharge fitting in axial alignment therewith, the guide member 60 is resiliently urged against the ball valve member, and the valve member is maintained on the seat ring 56 irrespective of which of these three fittings is opposite the discharge fitting. The ball guide member is made of a sutiable hard, wear-resistant material, preferably a moldable plastic such as Nylatron.

The valve guide ring and spring arrangement for maintaining the ball valve member in sealing engagement against the seat ring furnishes another function. As illustrated in FIGS. 3 and 4, and more particularly in FIG. 3A, the described arrangement permits the flow of gas from the port 42 to the port 36, or from a port on the Z axis to a port on the X axis when the ball valve member is in its closed position. Thus, to fill a bottle or cylinder with air or gas without dismantling the valve, the gas entering the internal chamber 22 of the valve body from a filler valve fitting H in the port 42 may follow the path indicated by the arrows in FIG. 3A to pass through the bottle fitting E within the port 36. These directions of flow within the valve are furnished by the gas being able to enter the internal chamber 22 and pass through the turns of the coiled compression spring 62 into the bottle fitting. The guide ring and spring arrangement 60, 62, by maintaining the closed ball valve member in sealing engagement against the seat ring 56, prevents the loss of the gas through the discharge fitting. It will be apparent that filling of the gas container or bottle may be accomplished in other positional locations of the filler valve and the bottle fitting than shown in FIGS. 3, 3A and 4. The only limitation being that the filler valve cannot be positioned opposite and in axial alignment with the port in which the discharge fitting is located. Otherwise, the filler valve may be located in any one of the ports 34, 36, 38 and 40, as well as in port 42 and, as previously indicated, the bottle fitting may be positioned on any one of the three axes in any one of the five ports.

As shown in FIGS. 3 and 4, the valve shaft 26 which serves to rotate the ball valve member B, extends through the opening 24 in the valve body. The valve shaft is made of cylindrical or round rod stock and has its diameter reduced in the area 64 where it carries a resilient O-ring 66 to prevent linkage. Preferably, an adjacent back-up ring 68 is positioned above and adjoining the O-ring to increase the life of the O-ring. The back-up ring is made of a tough, non-galling, wear-resistant material such as Teflon. A thrust-bearing 70 made of a suitable non-galling, wear-resistant material such as Nylatron, absorbs the forces imposed on the shaft and acts to reduce the forces of friction when the valve shaft is rotated. The thrust-bearing 70 is positioned intermediate an annular flange 72 formed on the shaft and an annular shoulder 73 constituting the bottom wall of a counterbore which opens onto the internal chamber 22 of the valve body at the valve shaft opening 24. The annular flange 72, as shown in FIGS. 3, 3A and 4, is the area of largest diameter of the valve shaft and is located in the internal chamber near the lower end of the shaft. The outer end of the valve shaft 26 is provided with a slot 74 extending through the diameter of the shaft. The slot 74 is adapted to receive a resilient or longitudinally split pin 76 which is associated with the pulley C to key the pulley to the valve shaft. As will subsequently appear, it is preferred that the pulley C be formed to selectively receive the split pin 76 in one of a pair of positions so that the relationship of the pulley to the valve shaft, and therefore to the ball valve member B, may be changed to accommodate the selected quadrant of the valve body providing the port within which the discharge fitting is positioned.

The valve shaft 26 is formed at its lower end, and the ball valve member B is cooperatively formed, to provide means for furnishing what is in effect a universal joint for the valve member. The valve member is free for movement to an extent which may accommodate the misalignment of the seated valve member and the shaft due to manufacturing tolerances. Metal to metal contact is eliminated thereby diminishing the torque required to rotate the ball valve. A measure of flexibility is provided to compensate for the fact that the ball valve and the valve shaft cannot be perfectly aligned within normal manufacturing practice. Also, the ball valve member and valve shaft are cooperatively related to allow flow through the valve member in a manner to accommodate flow through ports which are out of axial alignment.

Figures 7, 8, 9:
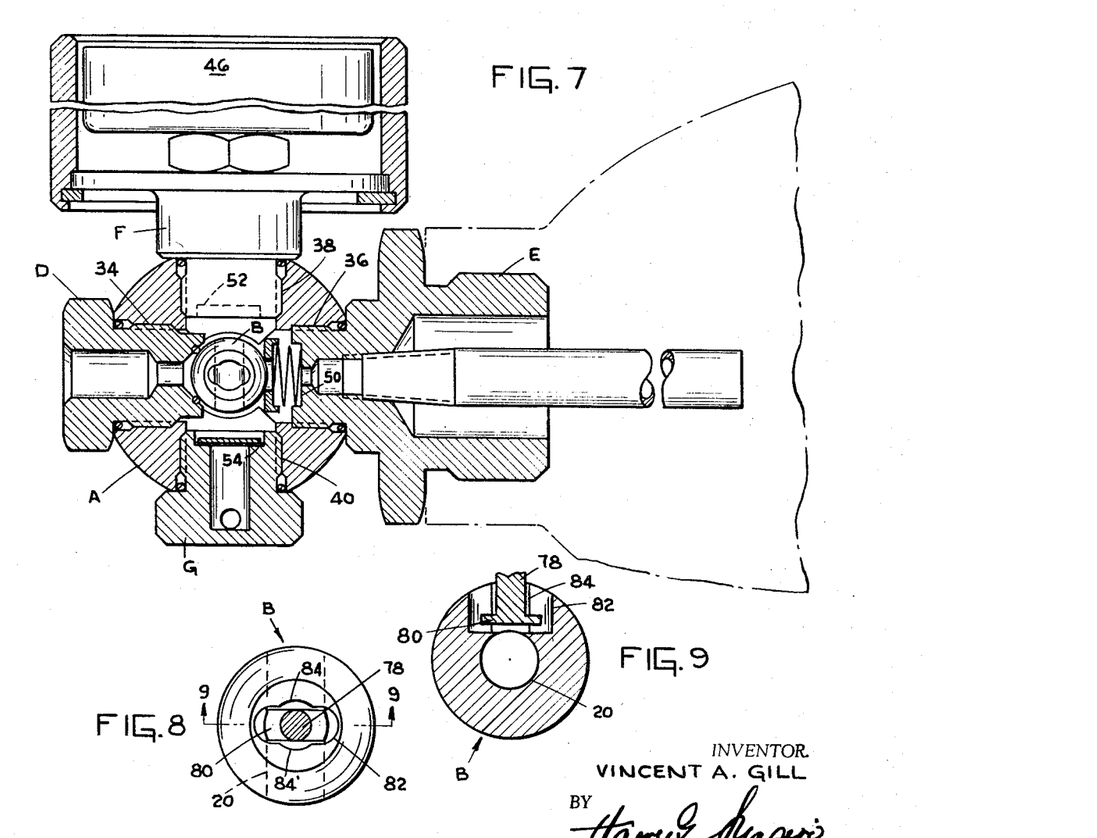
FIG. 7 is a horizontal cross-sectional view taken approximately in the plane of line 7—7 of FIG. 2, this view showing the valve in closed position.
FIG. 8 is an enlarged top plan view of the plug or ball valve member of the valve of the invention, this view showing an associated portion of the valve shaft.
FIG. 9 is a vetrical cross-sectional view taken approximately in the plane of line 9—9 of FIG. 8.

As shown in FIGS. 3, 3A and 4, the lower end of the valve shaft 26 or the portion beneath the annular flange 72 is of a reduced diameter at 78. As shown in FIGS. 8 and 9, the lower end of the valve shaft terminates in a tang 80 which is substantially rectangular in shape and possesses a length greater than the diameter or cross-section of the valve shaft portion 78. The tang 80 is received in a substantially rectangular and longer slot 82 formed in the top of the ball valve member B. Except centrally at the sides and at the ends, the clearance between the tang and the walls of the slot is slight. As a result, the valve member is responsive to the rotation of the shaft. The slot 82 is in communication with the bore 20 and is angularly disposed with respect to the axis extending through the bore, such angle preferably being 90 degrees. This relationship of valve member and shaft furnishes a desired measure of axial eccentricity and annular misalignment between the valve shaft and valve member without binding or side loads being exerted upon the valve shaft. The ball valve member B is maintained on the seat provided by the sealing ring 56 at the desired level by the resiliently mounted guide and support ring 60 on the opposite side of the valve member, whereby the tank 80 is not bottomed in the slot 82. Thus, while the ball valve member is properly maintained and supported in position within the internal chamber 22 of the valve body, the shaft is related to the ball valve member to furnish a connection or joint of a character which supplies a measure of flexibility to compensate for the fact that the ball and shaft cannot be perfectly aligned in the normal course of manufacture. Also, will be subsequently explained, the tang and slot arrangement permits gas flow through the slot between ports which are out of axial alignment.

FIGS. 3 and 4 illustrate the pendulum effect afforded by the valve of the invention. There is clearance between the valve shaft 26 and the aperture 24 above the back-up ring 68, and such clearance is quite small in order to prevent extrusion of the back-up ring 68. The back-up ring acts to radially locate the upper end portion of the shaft, or the portion above the area of reduced diameter 64. Below the area 64, the clearance is made greater than above such area so that the valve shaft can swing somewhat like a pendulum to a limited extent. Metal to metal contact of the valve shaft with the valve body A is prevented by the aforementioned thrust-bearing 70 and the back-up ring 68 which protrudes beyond the diameter of the shaft to make contact with the wall of the valve shaft opennig 24 and the adjoining portion of the valve shaft at its reduced area 64.

Figure 11:
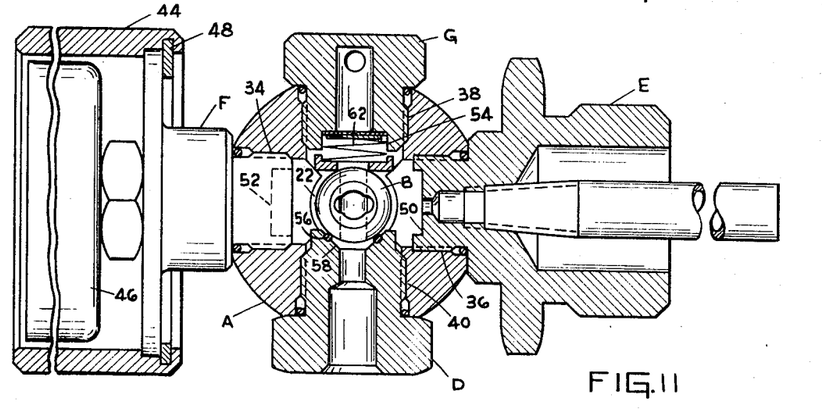
FIG. 11 is a view similar to FIG. 10, this view showing the valve in open position.
Figure 11A:
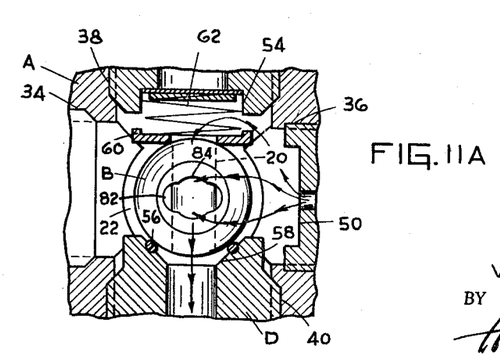
FIG. 11A is an enlarged view of the valve in the open position of FIG. 11 indicating the directions of gas flow through unaligned ports of the valve.

As shown in FIGS. 3, 3A, 4, 7, 10, 11 and 11A, the ball valve member B is situated within the internal chamber 22 of the valve body A and spacially related to the fittings which are received within the ports. Thus, air or a gas under pressure may surround the ball valve member within the internal chamber. In the closed position of the ball valve member, gas is prevented from flowing through the discharge fitting because the through-hole 20 of the ball valve member is not in alignment with the discharge fitting, and because the valve member is urged against the seat ring 56 by the resiliently mounted guide and supporting ring 60. Gas within the internal chamber 22 of the valve body under pressure therefore has access to the slot 82 of the valve member. As best shown in FIG. 8, the slot 82 is widened at opposite sides thereof, at 84, 84', to furnish additional channels for the flow of gas to the through-hole 20 of the valve member. These channels extend parallel to the axis of rotation of the ball valve member and perpendicularly to the axis of the valve member's bore 20 with which they are in communication. These areas of increased width or the channels 84, 84' are located midway of the length of the slot 82 and of the length of the tang 80 so that the dimensional relationship of the slot and tang for the purpose of furnishing the universal joint for the valve member, as previously described, is not affected. As a result, and as shown in FIG. 11, when the discharge fitting D is threaded into the port 40 for example, which is located at 90 degrees with respect to the port 36 within which the bottle fitting is located, and with the valve member B having been rotated to open position so that its bore 20 is in alignment with the port 40, the gas is capable of flowing from the bottle fitting and out through the discharge fitting, though the ports 36 and 40 are not in axial alignment. Such flow of the gas is indicated by the arrows on FIG. 11A, the gas flowing through the space or clearance between the tang 80 and the walls of the slot 82, and through the bore 20 via the opening in the guide ring 60. The clearance is substantial at the ends of the tang, beneath the tang, and midway of its sides where the added channels 84, 84' are located. Although a pair of channels 84, 84' are illustrated and preferred, it is within the scope of the invention to have a single channel in communication with the bore 20.

It will be apparent therefore that the discharge fitting may be positioned in any one of the ports 34, 36, 38 and 40, and the bottle fitting, pressure gauge fitting and relief valve may be positioned in any one of the three remaining ports whether the discharge and bottle fittings are axially aligned or misaligned. It is only necessary that there be a 90 degree arc of rotation of the ball valve member between closed position and open position so that in the latter position the bore 20 will be in alignment with the port within which the discharge fitting is threaded. The means for changing the positional relationship of the valve member and its shaft to accommodate a 90 degree change from the port in which the discharge fitting was positioned, will now be explained.

Figure 5:
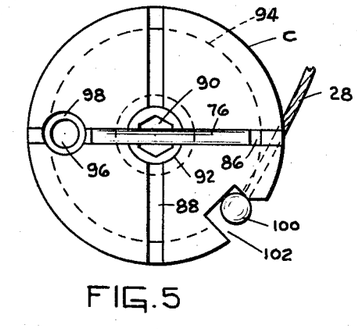
FIG. 5 is a plan view of the underside of the valve's pulley member and associated parts when the valve is in the closed position of FIG. 3.
Figure 6:
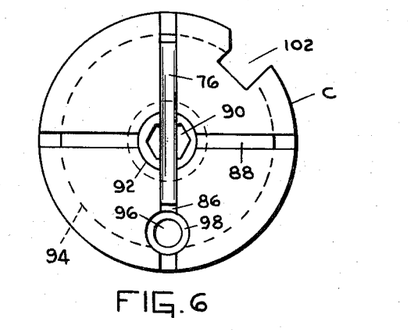
FIG. 6 is a view similar to FIG. 5, this view showing the pulley and its associated parts when the valve is in the open position of FIG. 4.

As shown in FIGS. 5 and 6, the pulley C is provided on its underside with a pair of perpendicularly arranged slots 86 and 88 which extend across the diameter of the pulley. As shown in FIGS. 3 and 4, the pulley has a central aperture 90 of a larger diameter than the upper slotted end of the valve shaft to allow such end of the shaft to be received in the opening. The upper surface of the pulley is provided with a central, upstanding, apertured boss 92 which is internally formed to receive an Allen wrench. The pulley is further formed with an annular slot 94 which is open to the periphery of the pulley. Also, the pulley is provided with a vertical detent aperture 96 which extends through the entire thickness of the pulley member. The pulley member is counterbored at the aperture 96 to provide a shoulder 98 on the underside of the pulley. The detent aperture 96 is located near the periphery of the pulley and intersects the slot 86, which like the slot 88, is adapted to selectively receive the resilient, split pin 76. The slots 86 and 88 are made of the same width and depth. The resilient pin when press fitted in either of the slots 86 or 88 and positioned within the valve shaft slot 74, keys the pulley to the valve shaft. The resilient pin is removable from the pulley member slots by a sharp-pointed tool.

Figure 1:
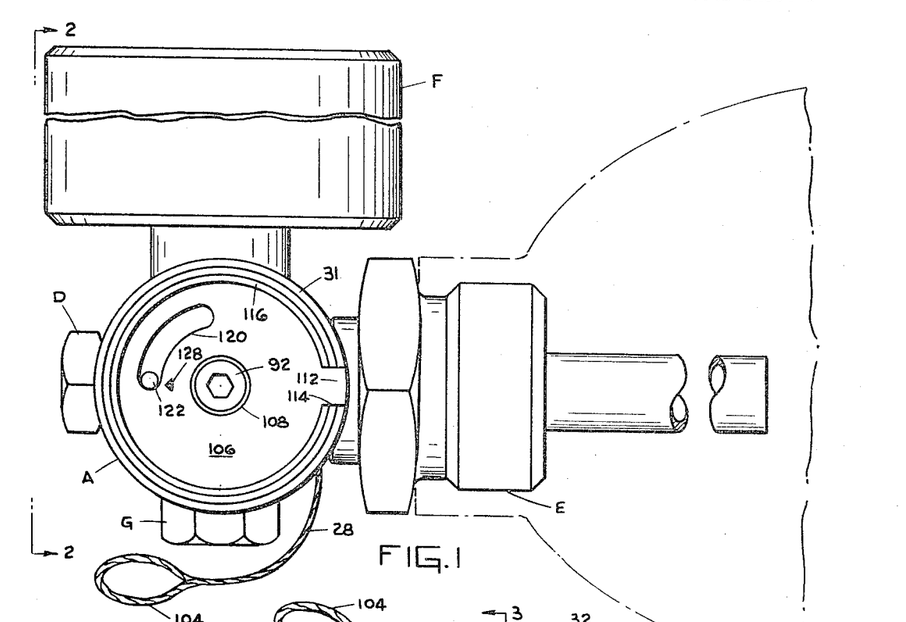
FIG. 1 is a top plan view of a valve made in accordance with the invention when associated with the fittings therefor in one arrangement of the fittings, this view further showing a gas container in phantom or in dot-dash lines.

The peripheral slot 94 of the pulley receives the cable 28 which has on the inner end thereof a protuberance 100, as shown in FIG. 5. When the valve is armed or in closed position ready for opening, the protuberance 100 is positioned in a recess 102 formed at the periphery of the pulley member, the recess 102 being in communication with the annular cable slot 94. As shown in FIGS. 1 and 2, the cable 28 is formed at its opposite end with a loop 104 to facilitate manual grasping and the application of tension to the cable when the valve member B is to be rotated to open position. The cable is in communication with the pulley through the aforementioned cable port 32 formed in the wall 31 of the valve body A providing the recess 30 for the contained pulley.

As shown in FIGS. 1, 3 and 4, the pulley is maintained within the recess 30 by a retaining plate 106. The retaining plate is formed with the central aperture 108 to allow the boss 92 of the pulley to extend therethrough and to permit access to the internally formed portion of the boss adapted to receive an Allen wrench. The pulley retainer plate is positioned above the upper surface of the pulley in spaced relation thereto, being centrally seated on an annular lip provided by a bearing 110. The bearing is preferably made of a material having a low coefficient of friction, such as Teflon whereby the pulley may rotate freely though in engagement with a portion of the bearing. The pulley retainer plate is prevented from rotation by providing it with a laterally extending tang 112 which is received within a mating slot 114 formed in the pulley recess wall 31. As shown in FIGS. 3 and 4, the pulley retainer plate 106 is removably held in place by an internal snap ring 116 which is received in an internal groove 118 formed in the recess wall 31.

As shown in FIG. 1, the pulley retainer plate 106 is provided with an arcuately formed or kidney-shaped cutout 120. Such cutout cooperates with means associated with the pulley to act as a stop and prevent excessive rotation of the pulley and its associated valve shaft and valve member. The sweep or subtended length of the cutout 120 is 90 degrees or the extent of rotation desired for the valve member B between its closed and open positions.

As shown in FIGS. 1 and 3, a resiliently mounted stop pin or detent 122 is extended through the detent aperture 96 in the pulley with the nose of the stop pin receivable within a depression 124 formed in the upper surface of the wall defining the bottom of the recess 30 for the pulley. The shank of the pin has its upper end extended through the arcuate cutout 120 in the pulley retainer plate. The detent pin is resiliently urged downwardly by a spring 126, one end of which bears against the shoulder 98 and the other end of which bears against the underside of the head of the detent pin, the head portion of the pin being of a larger diameter than the shank portion, as shown in FIG. 3. The pulley retainer plate is provided with a suitable mark or indicia 128 for alignment with the detent pin 122 to indicate when the valve is in closed position.

In the closed position of the valve, the detent pin 122 has its lower end positioned within the depression 124 to prevent inadvertent opening of the valve. When the valve is armed or in its closed position, the spring loaded detent pin enters the depression 124 with an audible click and notifies the one arming the valve that the pulley and associated ball valve member are in proper position ready for actuation and opening of the valve when desired. To return the opened valve to closed position, the Allen wrench is inserted into the boss 92 and the pulley rotated to the position where the valve member B has its bore 20 turned 90 degrees from where the discharge fitting may be positioned whichever of the four ports 34, 36, 38 or 40 the discharge fitting may be positioned in. Since the discharge fitting may be positioned in any one of these four ports, the split pin 76 is pressed into either the pulley slot 86 or 88 before the pulley and split pin are placed over the valve shaft with the pin in the valve shaft slot 74. The valve shaft is, of course, oriented about its axis of rotation so that rotation of the valve shaft by the pulley and pin arrangement will align the bore 20 of the valve member with the port in which the discharge fitting is located for the open position of the valve.

It is believed that the advantages and improved results of the invention will be apparent from the foregoing detailed description of the illustrated and preferred embodiment of the invention. With a single valve made in accordance with the invention, the discharge fitting may be positioned in any one of the valve's four ports—34, 36, 38, or 40; the bottle fitting, the filler valve fitting, the rupture disk fitting and the pressure gauge fitting may be positioned in any one of these four ports, and each of such fittings may additionally be positioned in the fifth port, or the port 42. Thus, the valve of the invention permits twenty-four different variations of fittings in relation to the position of the cable port 32, where only the ports 34, 36, 38 and 40 are of the same diameter and threading. Where the fifth port, port 42, is of identical diameter and threading, many additional variations are afforded. Furthermore, the described mounting of the ball valve member furnishes a desired seal, irrespective of the positional relationships of the various fittings within the valve's ports. Moreover, the universal joint afforded by the relationship of the valve shaft and the valve member, and the pendulum effect provided by the relationship of the valve shaft and the valve body, furnishes proper operation and sealing at minimal cost of manufacture of the valve.

While the illustrated and preferred form of the invention contemplates a valve having five ports, it will be apparent that the mounting of the plug valve member and valve shaft may be utilized in a valve having a lesser number of ports. Also, while the means for actuating the valve member is preferably a pulley and cable arrangement, it is within the scope of the invention to rotate the valve shaft and valve member by other means.

It will be apparent that various changes and modifications may be made to the illustrated and preferred embodiment of the invention without departing from the spirit and scope of the invention as sought to be defined in the following claims.

I claim:

1. A valve comprising a body having an internal chamber, said body having a pair of opposite, axially aligned, internally threaded ports in communication with said chamber, a rotatable valve shaft extending through an opening in said body on an axis perpendicular to the axis of said ports, said shaft having an annular flange within said internal chamber, a thrust-bearing intermediate the flange and the adjoining portion of the valve body, said shaft having a portion below the flange of a reduced thickness terminating in a substantially rectangular tang, said tang having a length greater than the thickness of the valve shaft portion intermediate the flange and the tang, a valve member having a bore extending therethrough positioned in said internal chamber, said valve member having a slot therein receiving said tang, the tang and the slot being dimensionally related to furnish a universal joint, a seat ring positioned in said internal chamber for engagement with the valve member, and resiliently mounted means opposite said seat ring for urging the valve member against the seat ring.

2. A valve as set forth in claim 1, wherein the valve member is a spherical ball.

3. A valve comprising a body having an internal chamber, said body having a pair of opposite, axially aligned, internally threaded ports in communication with said chamber, a rotatable valve shaft extending through an opening in said body on an axis perpendicular to the axis of said ports, said shaft being formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within said internal chamber, a thrust-bearing intermediate the flange and the adjoining portion of the valve body, a valve member having a bore extending therethrough positioned in said internal chamber, said valve shaft being connected at its lower end to said valve member, a seat ring positioned in said internal chamber for engagement with the valve member, and resiliently mounted means opposite said seat ring for urging the valve member against the seat ring.

4. A valve as set forth in claim 3, wherein the valve member is a spherical ball.

5. A valve comprising a body having an internal chamber, said body having a pair of opposite, axially aligned, internally threaded ports in communication with said chamber, a rotatable valve shaft extending through an opening in said body on an axis perpendicular to the axis of said ports, said shaft being formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within said internal chamber, a thrust-bearing intermediate the flange and the adjoining portion of the valve body, said shaft having a portion below the flange of a reduced thickness terminating in a substantially rectangular tang, said tang having a length greater than the thickness of the valve shaft portion intermediate the flange and the tang, a ball valve member having a bore extending therethrough positioned in said internal chamber, said valve member having a slot therein receiving said tang, the tang and the slot being dimensionally related to furnish a universal joint, a seat ring positioned in said internal chamber for engagement with the valve member, and resiliently mounted means opposite said seat ring for urging the valve member against the seat ring.

6. A valve as set forth in claim 5, wherein the seat ring is positioned in alignment with one of the ports, and the resiliently mounted means opposite said seat ring for urging the valve member against the seat ring comprises a guide ring and a coiled compression spring to urge the guide ring against the valve member.

7. A valve comprising a body having an internal chamber, said body having a pair of opposite, axially aligned, internally threaded ports in communication with said chamber disposed on a first axis, said body having a second pair of opposite, axially aligned, internally threaded ports disposed on a second axis, the ports being of the same diameter and identically threaded, a rotatable valve shaft extending through an opening in said body on a third axis, said first, second and third axes being mutually perpendicular to one another, a ball valve member having a bore extending therethrough position in said internal chamber, said valve shaft being connected at its lower end to said valve member whereby rotation of the valve shaft rotates the valve member, a seat ring positioned in said internal chamber for engagement with the valve member, a guide ring in engagement with the valve member opposite said seat ring, a coiled compression spring for urging the guide ring against the valve member, and means for limiting the extent of rotation of the valve shaft to align the bore with a port.

8. A valve as set forth in claim 7, wherein the shaft has an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tank having a length greater than the thickness of the valve shaft portion intermediate the flange and the tang; and wherein the valve member is formed with a slot in communication with the bore receiving said tang, the tang and the slot being dimensionally related to furnish a universal joint for the valve member and a path for the flow of gas.

9. A valve as set forth in claim 7, wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, and a thrust-bearing intermediate the flange and the adjoining portion of the valve body.

10. A valve as set forth in claim 7, wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tang having a length greater than the thickness of the valve shaft portion intermediate the flange and the tang; and wherein the valve member is formed with a slot in communication with the bore receiving said tang, the tang and the slot being dimensionally related to furnish a universal joint and a path for the flow of gas.

11. A valve comprising a body having an internal chamber, said body having a pair of opposite, axially aligned ports in communication with said chamber disposed on a first axis, said body having a second pair of opposite, axially aligned ports disposed on a second axis, said first and second pairs of ports each having the same diameter and being identically threaded, said body having a fifth port in communication with said internal chamber disposed on a third axis, said first, second and third axes being mutually perpendicular to one another, a rotatable valve shaft extending through an opening in said body located on said third axis opposite the fifth port, a ball valve member having a bore extending therethrough positioned in said internal chamber, said valve shaft being connected at its lower end to said valve member whereby rotation of the valve shaft rotates the valve member, said valve member having a channel extending parallel to the shaft in communication with the bore, a seat ring positioned in said internal chamber for engagement with the valve member, a guide ring in engagement with the valve member opposite said seat ring, a coiled compression spring for urging the guide ring against the valve member, and means for limiting the extent of rotation of the valve shaft to align the bore with a port.

12. A valve as set forth in claim 11, wherein the fifth port has the same diameter and threading as the ports of the first and second pairs of ports.

13. A valve as set forth in claim 11, wherein the shaft has an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tang having a length greater than the thickness of the valve shaft portion intermediate the flange and the tang; and wherein the valve member is formed with a slot in communication with the bore receiving said tang, the tang and the slot being dimensionally related to furnish a universal joint for the valve member and a path for the flow of gas.

14. A valve as set forth in claim 11, wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, and a thrust-bearing intermediate the flange and the adjoining portion of the valve body.

15. A valve as set forth in claim 11, wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tang having a length greater than the thickness of the valve shaft portion intermediate the flange and the tang; and wherein the valve member is formed with a slot in communication with the bore receiving said tang, the tang and the slot being dimensionally related to furnish a universal joint and a path for the flow of gas.

16. A valve comprising a body having an internal chamber, said body having a pair of opposite, axially aligned ports in communiaction with said chamber disposed on a first axis, said body having a second pair of opposite, axially aligned ports disposed on a second axis, said first and second pairs of ports each having the same diameter and being identically threaded, said body having a fifth port in communication with said internal chamber disposed on a third axis, said first, second and third axes being mutually perpendicular to one another, a rotatable valve shaft extending through an opening in said body located on said third axis opposite the fifth port, a ball valve member having a bore extending therethrough positioned in said internal chamber, said valve shaft being connected at its lower end to said valve member, said valve member having a channel formed therein extending parallel to the shaft and in communication with the bore, a seat ring positioned in said internal chamber for engagement with the valve member, a guide ring in engagement with the valve member opposite said seat ring, a coiled compression spring for urging the guide ring against the valve member, a pulley for rotating the valve shaft and its associated valve member connected to the upper end of the valve shaft, the upper end of the valve shaft being slotted and extended through a central opening in said pulley, said pulley being provided on its underside with a pair of perpendicularly arranged slots, a resilient pin adapted to be selectively positioned in either of the pulley slots and within the slot of the valve shaft, and means for limiting the extent of rotation of the pulley.

17. A valve as set forth in claim 16, wherein the fifth port has the same diameter and threading as the ports of the first and second pairs of ports.

18. A valve as set forth in claim 16, wherein the valve body is formed to provide a recess to receive the pulley, the wall defining the recess having a cable port therethrough in communication with the pulley; and wherein the means for limiting the extent of rotation of the pulley comprises a pulley retainer plate overlying the pulley, said retainer plate having an arcuately-shaped opening therein subtending the desired arc of rotation for the pulley, and a resiliently mounted stop detent having a nose portion and a shank portion, the shank portion extending through said arcuately-shaped opening, the nose portion being cooperable with means provided by the body.

19. A valve as set forth in claim 16, wherein the shaft has an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tank having a length greater than the thickness of the valve shaft portion intermediate the flange and the tang; and wherein the valve member is formed with a slot in communication with the bore receiving said tang, the tang and the slot being dimensionally related to furnish a universal joint for the valve member and a path for the flow of gas.

20. A valve as set forth in claim 16, wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, and a thrust-bearing intermediate the flange and the adjoining portion of the valve body.

21. A valve as set forth in claim 16, wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tang having a length greater than the thickness of the valve shaft portion intermediate the flange and the tang; and wherein the valve member is formed with a slot in communication with the bore receiving said tang, the tang and the slot being dimensionally related to furnish a universal joint and a path for the flow of gas.

22. A valve as set forth in claim 16, wherein the fifth port has the same diameter and threading as the ports of the first and second pairs of ports; wherein the valve body is formed to provide a recess to receive the pulley, the wall defining the recess having a cable port therethrough in communiaction with the pulley; wherein the means for limiting the extent of rotation of the pulley comprises a pulley retainer plate overlying the pulley, said retainer plate having an arcuately-shaped opening therein subtending the desired arc of rotation for the pulley, and a resiliently mounted stop detent having a nose portion and a shank portion, the shank portion extending through said arcuately-shaped opening, the nose portion being cooperable with means provided by the body; wherein the shaft is formed intermediate its length with an area of reduced diameter, an O-ring at said area surrounding the shaft and in engagement with the adjoining portion of the valve body, a back-up ring in the area of reduced diameter adjoining the O-ring, the portion of the shaft above the area of reduced diameter having a slight amount of clearance with respect to the opening, the portion of the shaft below the area of reduced diameter having a larger amount of clearance with respect to the opening, said shaft having an annular flange within the internal chamber, a thrust-bearing intermediate the flange and the adjoining portion of the valve body; wherein the shaft is connected to the valve member by a portion below said flange having a reduced thickness terminating in a substantially rectangular tang, said tang having a length greater than the thickness of the valve shaft portion intermediate the flange and the tang; and wherein the valve member is formed with a slot in communiaction with the bore receiving said tang, the tang and the slot being dimensionally related to furnish a universal joint and a path for the flow of gas.

References Cited by the Examiner

UNITED STATES PATENTS

| | | | |
|---|---|---|---|
| 2,685,427 | 8/1954 | Bugg | 251—185 X |
| 2,698,731 | 1/1955 | Koehler | 251—315 X |
| 2,930,575 | 3/1960 | Britton | 251—315 X |
| 2,973,182 | 2/1961 | Gill | 251—315 X |

FOREIGN PATENTS 498,975    11/1954    Italy.

CLARENCE R. GORDON, *Primary Examiner.*